Figure 1:
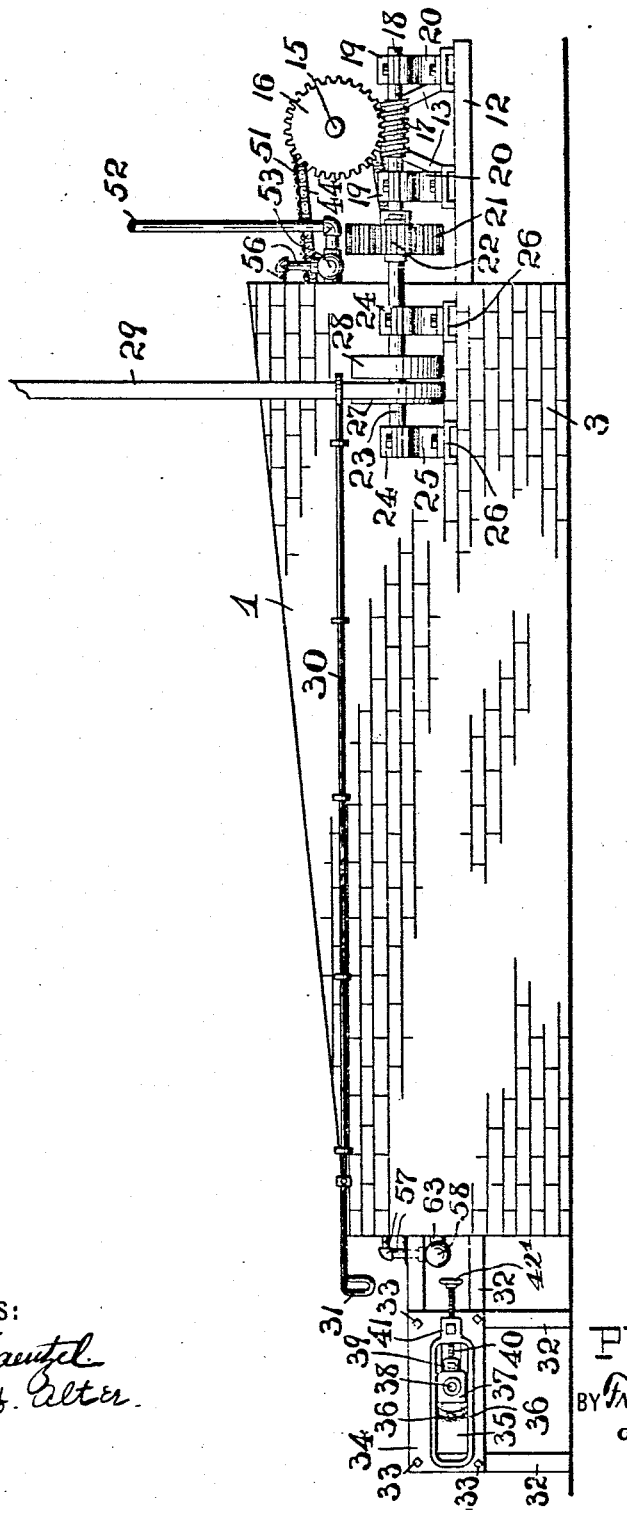

No. 895,077. PATENTED AUG. 4, 1908.
P. C. DONNER.
APPARATUS FOR DRYING, BAKING, OR ROASTING.
APPLICATION FILED OCT. 26, 1906.

5 SHEETS—SHEET 1.

WITNESSES:
F. H. W. Fraentzel
Anna H. Alter

INVENTOR:
Philip C. Donner,
BY Fraentzel
and Richards,
ATTORNEYS.

No. 895,077. PATENTED AUG. 4, 1908.
P. C. DONNER.
APPARATUS FOR DRYING, BAKING, OR ROASTING.
APPLICATION FILED OCT. 26, 1906.
5 SHEETS—SHEET 5.

WITNESSES:
INVENTOR:
Philip C. Donner,
BY
Fraentzel and Richards,
ATTORNEYS

UNITED STATES PATENT OFFICE.

PHILIP C. DONNER, OF SUMMIT, NEW JERSEY.

APPARATUS FOR DRYING, BAKING, OR ROASTING.

No. 895,077.

Specification of Letters Patent.

Patented Aug. 4, 1908.

Application filed October 26, 1906. Serial No. 340,639.

*To all whom it may concern:*

Be it known that I, PHILIP C. DONNER, a subject of the Emperor of Germany, residing at Summit, in the county of Union and State of New Jersey, have invented certain new and useful Improvements in Apparatus for Drying, Baking, or Roasting; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The present invention has reference, generally, to that class of apparatus which are used more particularly for drying purposes, but which under certain conditions may be employed also for baking or roasting purposes.

This invention relates, more especially, to a novel device or apparatus which is to be used principally for the drying of furs, skins, and the like; but which may be used also in the manner of a baker's oven, for baking and other kindred purposes.

The invention has for its principal object to provide a simple and efficiently operating device of the general character hereinafter more fully set forth, in which the article or material which is to be dried or baked, as the case may be, is fed at one side into a heated receptacle or chamber, traveling through the said receptacle or chamber at a rate which will thoroughly dry or bake the article or material, and then passing in its dried or baked condition from the opposite side of the receptacle or chamber.

A further object of this invention is to provide a novel feeding device or carrier upon which the articles or the materials which are to be dried or baked, are placed, and caused to move between a system of heat-conveying pipes or ducts, so that the heat will be applied directly upon all sides of the article or material, and the conveyer or carrier being provided with suitable openings through which the heat readily passes, said conveyer being usually of a wire-woven mesh, or a wire-belt of any suitable construction.

Other objects of this invention not at this time more particularly mentioned will be clearly understood from the following detailed description of the same.

With the various objects of my present invention in view, the invention consists, primarily, in the novel drying or baking apparatus hereinafter set forth; and, furthermore, this invention consists in the novel arrangements and combinations of the various devices and parts, as well as in the details of the construction of the same, all of which will be hereinafter more fully described and then finally embodied in the clauses of the claims which are appended to and which form an essential part of this specification.

Figure 2:
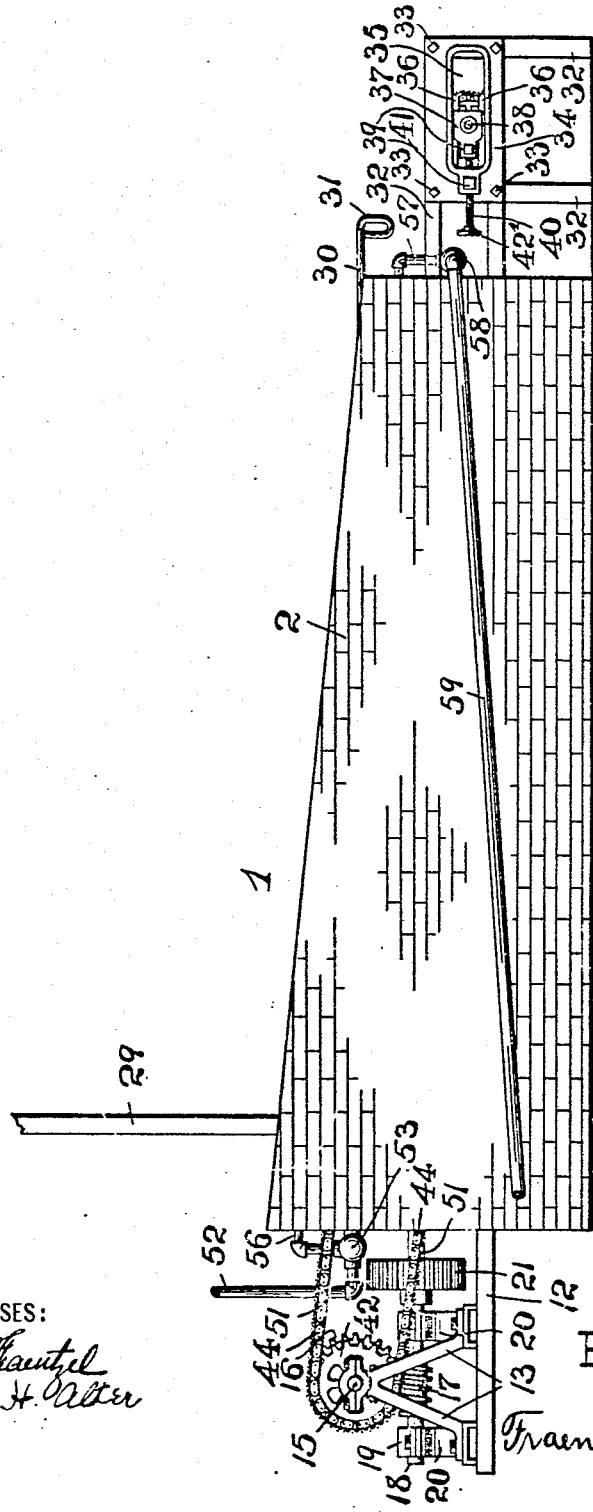
Figure 3:
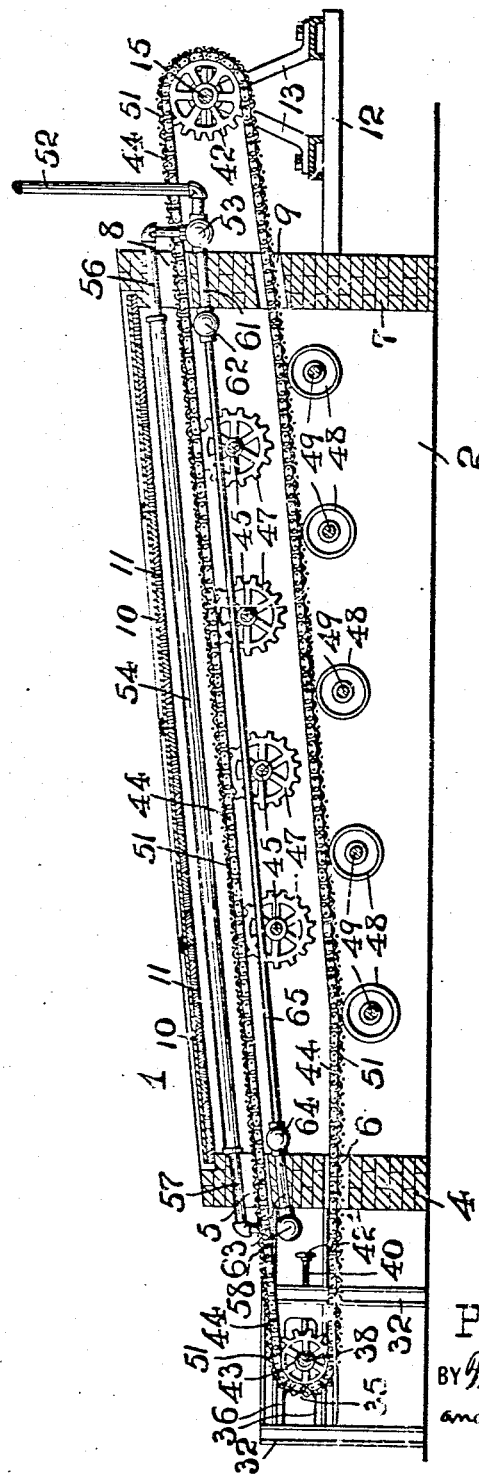
Figure 4:
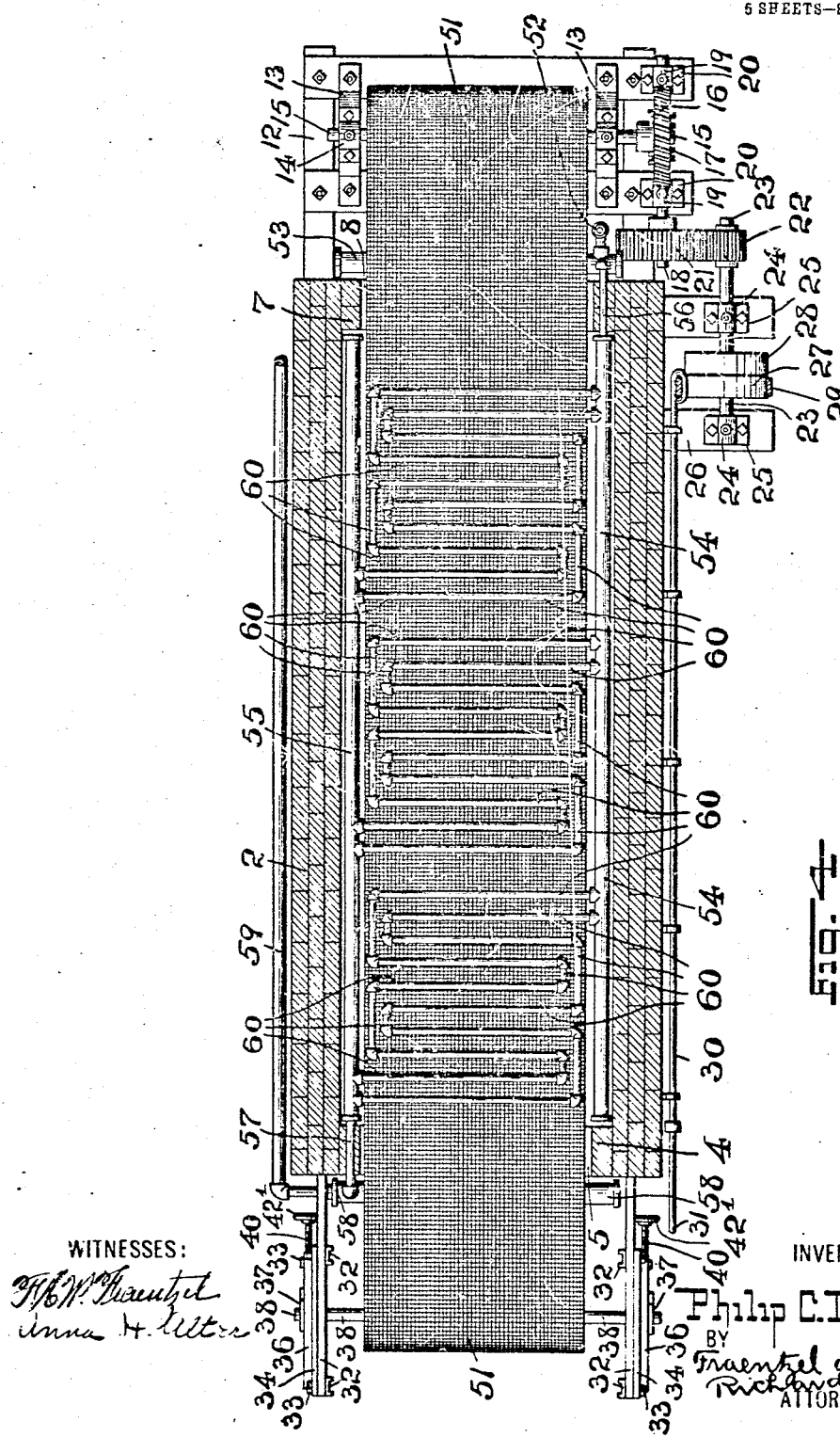
Figure 5:
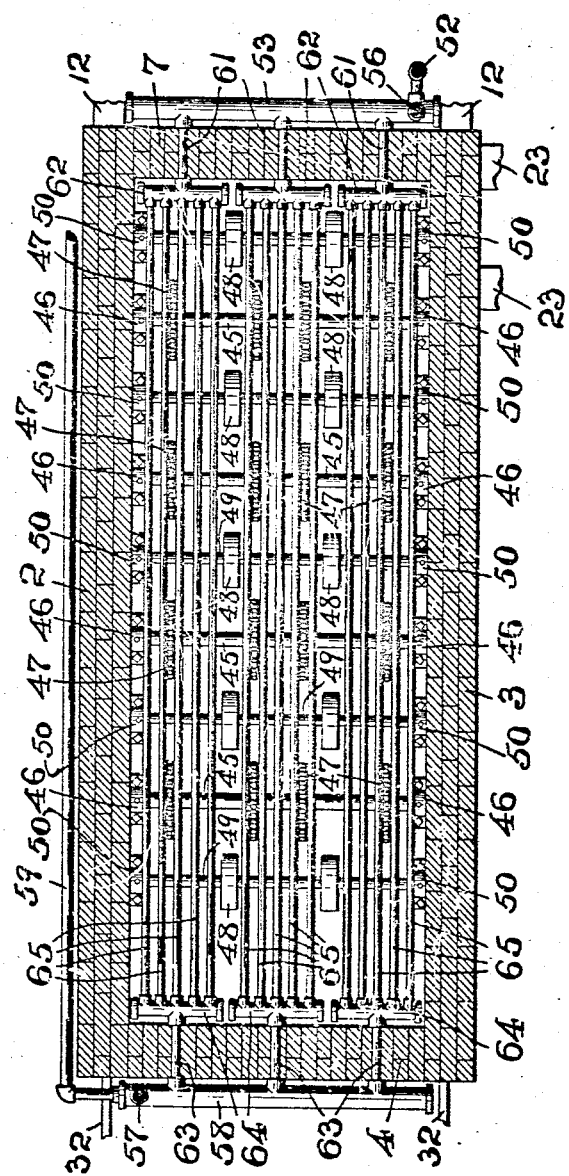

The invention is clearly illustrated in the accompanying drawings, in which:—Figure 1 is an elevation of the one side of the device or apparatus; and Fig. 2 is a similar view of the opposite side of the apparatus. Fig. 3 is a longitudinal vertical sectional representation of the receptacle or chamber, and the variously arranged and laterally extending shafts therein, said view showing also in side elevation, the arrangement of the conveyer or carrier, and the systems of heating coils or pipes disposed upon the opposite sides of the conveyer or carrier. Fig. 4 is a horizontal sectional representation of the receptacle or chamber, the conveyer or carrier, the mechanism for operating the belt, and the upper system of heating coils or pipes, all being shown in plan or top view; and Fig. 5 is a detail horizontal sectional representation of the receptacle or chamber, showing in connection therewith, and in plan or top view, an arrangement of the lower system of heating pipes, and the various shafts with their ratchet-wheels and feed-rollers or pulleys, the conveyer or carrier and the mechanism for operating the same being omitted from the view.

Similar characters of reference are employed in all of the various figures of the drawings, to indicate corresponding parts.

Referring now to the several figures of the drawings, the reference-character 1 indicates the complete apparatus or device embodying the principles of this invention and to be used for drying or baking purposes, said apparatus consisting, usually, of a long receptacle or chamber, built of brick or any suitable material, and comprising the two sides 2 and 3, the front end 4 which is provided with a pair of openings 5 and 6, and the rear end 7, made with openings 8 and 9. This receptacle, chamber or compartment, is closed at the top with a series of removably arranged iron or other suitable doors or covers 10, which are preferably sheathed with asbestos layers 11.

At one end of said receptacle, as at its rear end, and situated upon the outside of the apparatus, is a suitably constructed support 12 carrying suitable pedestals 13 provided with bearings 14 in which is revolubly arranged a driving shaft 15. This shaft carries upon one end a worm-wheel 16, and in mesh therewith is a worm 17, secured upon a spindle 18 which is rotatably arranged in bearings 19 carried by the pedestals 20, also suitably disposed and secured upon said support 12. The spindle 18 is provided with a gear 21, and in mesh with said gear is a pinion 22 which is secured upon a main driving shaft 23, rotatably arranged in the bearings 24 of a pair of pedestals 25 which are suitably secured upon supports or brackets 26 at the side of the apparatus, substantially as shown. Upon said shaft 23 is a loose pulley 27 and a fast pulley 28, driving a belt 29 passing over said loose pulley and being adapted to be shifted from said loose pulley upon the fast pulley by means of a belt-shifter 30, which extends along the outer side of the apparatus toward the front end of the same, and is provided at said end with a suitable operating handle or member 31.

At the front end of the apparatus is a suitable arrangement of supports or brackets 32, each support having suitably secured to its side, by means of bolts or screws 33, a plate 34. Each plate is made with a longitudinally extending opening 35, and guides 36, between which are slidably arranged suitable bearing-blocks 37, carrying a laterally extending shaft 38. Connected with each bearing-block 37 is a hub 39 to which is rotatably attached the end-portion of an adjusting screw 40. Each screw 40 extends through a screw-threaded boss 41 at the side of each plate 34, and 42¹ is a finger-piece or handwheel for making the desired adjustments of the bearing-boxes or block 37 and the shaft which is mounted in said bearings, as will be clearly evident.

Suitably disposed upon the shaft 15 are a series of sprocket-wheels 42, and upon the shaft 38 are correspondingly arranged sprocket-wheels 43, suitable link-chains 44 passing over each pair of sprocket-wheels 42 and 43, the chains passing from the wheel 41 through the opening 5 into the interior of the apparatus, then out of the opening 8 and over the wheel 43, returning through the opening 9 into the chamber, and then out of the opening 6 back upon the wheel 42, as clearly indicated in Fig. 3 of the drawings. Within the interior or chambered portion of the apparatus are other shafts 45 rotatably arranged in bearings 46, each shaft 45 carrying correspondingly arranged sprocket-wheels 47 upon which the upper or inwardly moving portions of the link-chains are operatively supported, the lower or returning or outwardly moving portions of the link-chains being in rolling contact with suitably disposed rollers 48, arranged upon another set of shafts 49 rotatably arranged in suitable bearings 50, placed lower down within the drying or baking chamber, as will be clearly understood from an inspection of the figures of the drawings.

A suitably constructed conveyer, apron, or carrier-belt 51 is suitably secured to the said link-chains in such a manner that when the said link-chains are operated, the said belt or conveyer will move through the chamber of the apparatus, as will be clearly understood. The belt, conveyer or carrier, as has been stated, is preferably provided with variously disposed and numerous openings, one preferred construction being a conveyer or carrier made of a wire-woven fabric.

One means of heating the interior of the apparatus or device is a system of heat-conveying pipes or ducts arranged above and beneath the upper or inwardly moving portion of the conveyer or belt.

The reference-character 52 indicates an inlet-pipe, which is connected with a manifold 53 extending across the rear of the apparatus. Within the chamber of the apparatus, extending longitudinally and adjacent to the inner side of each wall 2 and 3 are pipes or manifolds 54 and 55, respectively, and as shown more especially in Fig. 4 of the drawings, the pipe or manifold 54 being connected by means of a pipe 56 with the manifold 53. Extending from one end of the pipe or manifold 55 is a short pipe 57 which is connected with a manifold 58 extending laterally across and upon the outside of the front 4 of the apparatus, an outlet-pipe or exhaust 59 leading from said manifold 58. Connecting pipes or coils 60 are arranged between the pipes or manifolds 54 and 55, so as to establish communication between the latter, said pipes or coils 60 being arranged above the conveyer or carrier, substantially as illustrated.

Referring now more particularly to Fig. 5 of the drawings, it will be seen that there are a series of short pipes 61 which extend from the manifold 53, through the rear wall 7 of the apparatus, said pipes 61 being connected with manifolds 62 arranged against the inner face of said wall 7. In a like manner, a series of short pipes 63 extend from the manifold 58, through the front wall 4 of the apparatus, said pipes 63 being connected with manifolds 64 which are arranged against the face of said wall 4. A series of connecting pipes 65 are arranged between the several manifolds 62 and 64, substantially in the manner illustrated in said Fig. 5 of the drawings. From an inspection of Fig. 3 of the drawings, it will be seen, that the pipes 65 are arranged beneath the upper or inwardly moving portion of the conveyer or carrier.

Referring again to Fig. 3 of the drawings, it will be seen that the various heat-conveying pipes and coils, preferably pitch downwardly from the rear or back to the forward end of the chamber of the apparatus, the conveyer or belt moving slowly between the upper and lower sets of heaters, from the low end of the chamber to the high end of the same, and the belt being of an open mesh it enables, in practice, to arrange two skins on top of each other, with the hide-sides together, so that the respective fur-sides of the skins will always be nearest the upper and lower heating devices, or heating pipes and their coils, thereby doubling the capacity of the apparatus. This is also of great advantage when the apparatus is to be used for baking purposes, as thereby the loaves of dough which are placed upon the conveyer or belt, are subjected to the heat on top and bottom, as well as upon their sides.

The operation of the apparatus for drying, baking or roasting purposes, is very simple. It will easily be understood from an inspection of the drawings, as briefly is as follows:—After the conveyer-mechanism has been set in motion, and the heating medium, such as steam, hot water, or other heating medium is permitted to flow through the several pipes and coils, and the chamber of the apparatus has been brought to the desired degree of heat, the skins, or other matter to be treated, are placed in the manner previously stated upon the upper moving portion of the conveyer, directly in front of the opening or inlet 5 in the front wall 4. The skins, or other matter, are then slowly carried through the heated chamber, from front to rear, finally emerging through the opening 8 in the rear wall 7 in a perfectly dried, baked or roasted condition, according to the uses to which the apparatus is put, the articles being removed from the conveyer by an operator at the rear of the apparatus. From the foregoing description of my present invention it will be clearly seen, that I have devised a simply constructed and efficiently operating apparatus or device, in which the capacity of the work performed can be doubled, and in which a continuous drying, baking or roasting process is maintained.

I claim:—

1. In an apparatus of the character specified, a chambered body provided with openings in its front and rear walls, the openings in the front wall being lower than those in the rear wall, said body being adapted to contain heat, a driving shaft located at the rear and outside of said body, sprocket-wheels upon said shaft, slides located at the front and outside of said body, each slide carrying a bearing, means for adjusting said slides, a shaft rotatably mounted in the bearings of said slides, sprocket-wheels upon said shaft, link-chains arranged over the corresponding sprocket-wheels of said shafts, said chains extending into and through said chambered body, and a conveyer carried by said link-chains, said conveyer being made of an open-mesh fabric, and said conveyer being lower at the front where it enters the chambered body than at its point of outlet therefrom.

2. In an apparatus of the character specified, a chambered body provided with openings in its front and rear walls, the openings in the front wall being lower than those in the rear wall, said body being adapted to contain heat, a driving shaft located at the rear and outside of said body, sprocket-wheels upon said shaft, a shaft located at the front and outside of said body, sprocket-wheels upon said shaft, link-chains arranged over the corresponding sprocket-wheels of said shafts, said chains extending into and through said chambered body, each chain having an inwardly and an outwardly moving portion, other shafts extending laterally across the interior of said chambered body, sprocket-wheels upon some of said shafts in engagement with the inwardly moving portions of said link-chains, and rollers upon others of said shafts with which the outwardly moving portions of the link-chains are in rolling-support, and a conveyer carried by said link-chains, and said conveyer being lower at the front where it enters the chambered body than at its point of outlet therefrom.

3. In an apparatus of the character specified, a chambered body provided with openings in its front and rear walls, the openings in the front wall being lower than those in the rear wall, said body being adapted to contain heat, a driving shaft located at the rear and outside of said body, sprocket-wheels upon said shaft, a shaft located at the front and outside of said body, sprocket wheels upon said shaft, link-chains arranged over the corresponding sprocket-wheels of said shafts, said chains extending into and through said chambered body, each chain having an inwardly and an outwardly moving portion, other shafts extending laterally across the interior of said chambered body, sprocket-wheels upon some of said shafts in engagement with the inwardly moving portions of said link-chains, and rollers upon others of said shafts with which the outwardly moving portions of the link-chains are in rolling support, and a conveyer carried by said link-chains, said conveyer being made of an open-mesh fabric, and said conveyer being lower at the front where it enters the chambered body than at its point of outlet therefrom.

4. In an apparatus of the character specified, a chambered body provided with openings in its front and rear walls, the openings in the front wall being lower than those in the rear wall, said body being adapted to contain heat, a driving shaft located at the rear and outside of said body, sprocket-wheels upon said shaft, slides located at the front and outside of said body, each slide carrying a bearing, means for adjusting said slides, a shaft rotatably mounted in the bearings of said slides, sprocket-wheels upon said shaft, link-chains arranged over the corresponding sprocket-wheels of said shafts, said chains extending into and through said chambered body, each chain having an inwardly and an outwardly moving portion, other shafts extending laterally across the interior of said chambered body, sprocket-wheels upon some of said shafts in engagement with the inwardly moving portions of said link-chains, and rollers upon others of said shafts with which the outwardly moving portions of the link-chains are in rolling support, and a conveyer carried by said link-chains, and said conveyer being lower at the front where it enters the chambered body than at its point of outlet therefrom.

5. In an apparatus of the character specified, a chambered body provided with openings in its front and rear walls, the openings in the front wall being lower than those in the rear wall, said body being adapted to contain heat, a driving shaft located at the rear and outside of said body, sprocket-wheels upon said shaft, slides located at the front and outside of said body, each slide carrying a bearing, means for adjusting said slides, a shaft rotatably mounted in the bearings of said slides, sprocket-wheels upon said shaft, link-chains arranged over the corresponding sprocket-wheels of said shafts, said chains extending into and through said chambered body, each chain having an inwardly and an outwardly moving portion, other shafts extending laterally across the interior of said chambered body, sprocket-wheels upon some of said shafts in engagement with the inwardly moving portions of said link-chains, and rollers upon others of said shafts with which the outwardly moving portions of the link-chains are in rolling-support, and a conveyer carried by said link-chains, said conveyer being made of an open-mesh fabric, and said conveyer being lower at the front where it enters the chambered body than at its point of outlet therefrom.

6. In an apparatus of the character specified, a chambered body, a heating system within said chamber, said system comprising two sets of pipes through which the heat is conducted, said pipe inclining downwardly from the rear end to the forward end of said chambered body, and a conveyer movably arranged between said sets of pipes, and said conveyer being lower at the front where it enters the chambered body than at its point of outlet therefrom.

7. In an apparatus of the character specified, a chambered body, an upper and a lower heating system within said chamber, said upper system comprising a pair of longitudinally extending pipes, and laterally extending connecting coils between said pipes, said lower system comprising laterally extending manifolds and longitudinally extending connecting pipes, and a conveyer movably arranged between said upper and lower heating systems, said conveyer being lower at the front where it enters the chambered body than at its point of outlet therefrom, and said upper and lower heating systems both being higher at one end than at the other end of said chambered body.

8. In an apparatus of the character specified, the combination with a chambered body, of a heating system, said heating system being higher at one end of the chambered body than at the other end thereof and comprising a manifold at the outer rear end of said body, an inlet pipe connected with said manifold, a pair of longitudinally extending pipes within said chambered body, laterally extending connecting coils between said longitudinally extending pipes, a means of communication between one of said pipes and said rear-end manifold, a manifold at the outer front end of said body, a means of communication between said other longitudinally extending pipe and said front-end manifold, and an outlet-pipe connected with said front-end manifold, manifolds within said chambered body, respectively, at the front and rear ends of said body, longitudinally extending pipes between the said manifolds, a means of communication between the rear-end manifolds within the chambered body and the rear-end manifold upon the outside of said body, a means of communication between the front-end manifolds within the chambered body and the front-end manifold upon the outside of said body, and a conveyer movably arranged within said chambered body and between said laterally extending coils and the longitudinally extending pipes which connect the inner rear and front-end manifolds, and said conveyer being lower at the front where it enters the chambered body than at its point of outlet therefrom, substantially as and for the purposes set forth.

In testimony, that I claim the invention set forth above I have hereunto set my hand this 25th day of October, 1906.

PHILIP C. DONNER.

Witnesses:
FREDK. C. FRAENTZEL,
ANNA H. ALTER.